US012725245B2

(12) United States Patent
Okazaki et al.

(10) Patent No.: US 12,725,245 B2
(45) Date of Patent: Sep. 1, 2026

(54) INFORMATION PROCESSING APPARATUS, CONTROL PROGRAM, AND CONTROL METHOD

(71) Applicant: KONICA MINOLTA, INC., Tokyo (JP)

(72) Inventors: Tomoya Okazaki, Tokyo (JP); Koki Tachi, Tokyo (JP); Yoshiyuki Takahashi, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 342 days.

(21) Appl. No.: 18/283,974

(22) PCT Filed: Feb. 15, 2022

(86) PCT No.: PCT/JP2022/005821

§ 371 (c)(1),
(2) Date: Sep. 25, 2023

(87) PCT Pub. No.: WO2022/201968

PCT Pub. Date: Sep. 29, 2022

(65) Prior Publication Data

US 2024/0161271 A1 May 16, 2024

(30) Foreign Application Priority Data

Mar. 26, 2021 (JP) ................................ 2021-052771

(51) Int. Cl.
*G06V 10/25* (2022.01)
*G06T 7/00* (2017.01)
*G06V 10/74* (2022.01)

(52) U.S. Cl.
CPC .............. *G06T 7/001* (2013.01); *G06V 10/25* (2022.01); *G06V 10/761* (2022.01)

(58) Field of Classification Search
CPC ........... G06T 7/001; G06T 2207/20081; G06T 2207/20084; G06T 2207/30124; G06V 10/25; G06V 10/761
(Continued)

(56) References Cited

U.S. PATENT DOCUMENTS

2017/0154234 A1 6/2017 Tanaka et al.
2020/0193232 A1 * 6/2020 Wang .................. G06F 18/2148
(Continued)

FOREIGN PATENT DOCUMENTS

CN 112287875 * 1/2021
JP S62249037 A 10/1987
(Continued)

OTHER PUBLICATIONS

EPO Extended European Search Report for corresponding EP Application No. 22774768.0; Issued Aug. 26, 2024.
(Continued)

*Primary Examiner* — Sheela C Chawan
(74) *Attorney, Agent, or Firm* — CANTOR COLBURN LLP

(57) ABSTRACT

Provided is an information processing apparatus capable of preventing erroneous detection of an abnormality even in a case where a region other than an inspection target region appears in an image of an object or even in a case where the appearance of the object may partially vary because of the nature of the object. An information processing apparatus includes: a generating section that acquires an image and generates a reconstructed image based on the image; an identification section that identifies an inspection target region in the image based on the image; and a calculation section that calculates a difference in the inspection target region between the image and the reconstructed image.

11 Claims, 8 Drawing Sheets

(58) Field of Classification Search
USPC .................................................. 382/100, 141
See application file for complete search history.

(56) References Cited

U.S. PATENT DOCUMENTS

| | | | | |
|---|---|---|---|---|
| 2020/0311895 | A1 | 10/2020 | Sakurai | |
| 2020/0364842 | A1* | 11/2020 | Chaton | G06V 10/764 |
| 2020/0364905 | A1 | 11/2020 | Shimodaira et al. | |
| 2020/0364906 | A1 | 11/2020 | Shimodaira | |
| 2021/0295485 | A1 | 9/2021 | Miyazawa | |
| 2022/0277439 | A1 | 9/2022 | Ikeda et al. | |

FOREIGN PATENT DOCUMENTS

| | | | |
|---|---|---|---|
| JP | 2011214903 | * | 10/2011 |
| JP | 2017096853 | A | 6/2017 |
| JP | 2017107541 | A | 6/2017 |
| JP | 2020160616 | A | 10/2020 |
| JP | 2020187656 | A | 11/2020 |
| JP | 2020187735 | A | 11/2020 |
| WO | 2018105028 | A1 | 6/2018 |
| WO | 2020031984 | A1 | 2/2020 |
| WO | 2021010269 | A1 | 1/2021 |

OTHER PUBLICATIONS

International Search Report for International Application No. PCT/JP2022/005821; Date of Mailing, May 24, 2022.
JPO Notice of Reasons for Refusal for corresponding JP Application No. 2023-508773; Issued Jul. 15, 2025.
SIPO The First Office Action for corresponding CN Application No. 202280022813.3; Issued Jul. 16, 2025.
JPO Notice of Reasons for Refusal for corresponding JP Application No. 2023-508773; issued Dec. 23, 2025.
SIPO 2nd Office Action for corresponding CN Application No. 202280022813.3; Issued Nov. 18, 2025.
SIPO Rejection Decision for corresponding CN Application No. 202280022813.3; Issued Mar. 2, 2026.
JPO Decision of Refusal for corresponding JP Application No. 2023-508773; issued Jun. 2, 2026.

* cited by examiner

INFORMATION PROCESSING APPARATUS, CONTROL PROGRAM, AND CONTROL METHOD

CROSS REFERENCE TO RELATED APPLICATIONS

This is the U.S. national stage of application No. PCT/JP2022/005821, filed on Feb. 15, 2022. Priority under 35 U.S.C. § 119 (a) and 35 U.S.C. § 365 (b) is claimed from Japanese Application No. 2021-052771, filed Mar. 26, 2021, the disclosure of which is also incorporated herein by reference.

TECHNICAL FIELD

The present invention relates to an information processing apparatus, a control program, and a control method.

BACKGROUND ART

In a production site or the like of an industrial product or the like, a defective product is sorted by detecting a defect in a product through visual inspection.

As visual inspection technologies, various technologies are known in which, for example, an image of a product is used to detect a defect by pattern matching with a reference image.

Patent Literature 1 listed below discloses the following visual inspection technology using machine learning. Using normal image data of an object captured by a camera or the like, a self-encoder or the like is trained so as to restore the normal image data. A difference between restored data generated from image data of the object captured by the camera or the like and the image data is calculated using the trained self-encoder or the like. Then, whether the object is abnormal is determined based on a magnitude of the difference. Accordingly, it is possible to eliminate the need for registration between the normal image as a reference for abnormality determination and the image of the object.

CITATION LIST

Patent Literature

Patent Literature 1: International Publication No. 2018/105028

SUMMARY OF INVENTION

Technical Problem

However, in the technology of the background art, in a case where a region other than an inspection target region appears in the image of the object, there is a possibility that even a normal product is determined to be a defective product because of an abnormal reaction in the region other than the inspection target region in a reproduced image, and erroneous detection of an abnormality occurs. In addition, because of the nature of an object such as a flap of an envelope in a folded state, in which a part of the object is not fixed, there is a case where the appearance of the object partially varies relatively significantly even if the object is a normal product. In this case also, in the technology of the background art, there is a possibility that erroneous detection of an abnormality occurs.

The present invention has been made to solve the above-mentioned problems. That is, an object of the present invention is to provide an information processing apparatus, a control program, and a control method capable of preventing erroneous detection of an abnormality even in a case where a region other than an inspection target region appears in an image of an object or even in a case where the appearance of the object may partially vary because of the nature of the object.

Solution to Problem

The above-described object of the present invention is achieved by the following means.

(1) An information processing apparatus including: a generating section that acquires an image and generates a reconstructed image based on the image; an identification section that identifies an inspection target region in the image based on the image; and a calculation section that calculates a difference in the inspection target region between the image and the reconstructed image.

(2) The information processing apparatus according to (1), wherein the identification section identifies, for each image, the inspection target region based on the image.

(3) The information processing apparatus according to (1) or (2), wherein the calculation section calculates the difference in the inspection target region by comparing a portion of the inspection target region extracted from the image with a portion corresponding to the inspection target region extracted from the reconstructed image.

(4) The information processing apparatus according to (1) or (2), wherein the calculation section calculates the difference in the inspection target region by extracting the difference corresponding to the inspection target region from the differences calculated by comparing entirety of the image with entirety of the reconstructed image.

(5) The information processing apparatus according to any one of (1) to (4), wherein the identification section identifies the inspection target region in the image by pattern matching between a predetermined reference image and the image.

(6) The information processing apparatus according to any one of (1) to (4), wherein the identification section identifies the inspection target region by estimating the inspection target region from the image using a learned model trained through machine learning so as to estimate the inspection target region from the image.

(7) The information processing apparatus according to (6), further including a reception section that receives designation of the inspection target region in a non-defective product image that is the image of a non-defective product, wherein the learned model is trained through machine learning so as to estimate the inspection target region from the image using as training data the inspection target region designated.

(8) The information processing apparatus according to any one of (1) to (5), further including a reception section that receives designation of the inspection target region in a non-defective product image that is the image of a non-defective product, wherein the identification section identifies the inspection target region in the image based on the inspection target region designated.

(9) The information processing apparatus according to any one of (1) to (8), wherein the calculation section calculates an abnormality degree of the image based on the difference.

(10) A control program for causing a computer to execute: (a) acquiring an image and generating a reconstructed image based on the image; (b) identifying an inspection target region in the image based on the image; and (c) calculating a difference in the inspection target region between the image and the reconstructed image.

(11) A control method including: (a) acquiring an image and generating a reconstructed image based on the image; (b) identifying an inspection target region in the image based on the image; and (c) calculating a difference in the inspection target region between the image and the reconstructed image.

Advantageous Effects of Invention

The inspection target region in the image is identified based on the image, and the difference in the inspection target region between the reconstructed image generated based on the image and the image is calculated. Thus, even in the case where the region other than the inspection target region appears in the image of the object or even in the case where the appearance of the object partially varies because of the nature of the object, it is possible to prevent the erroneous detection of the abnormality.

DESCRIPTION OF EMBODIMENTS

Figure 1:
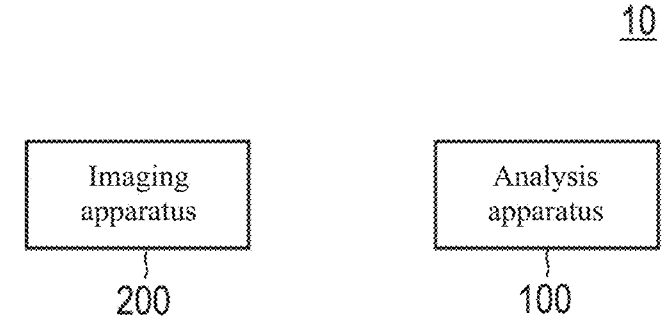
FIG. 1 is a diagram illustrating a configuration of an inspection system.

Hereinafter, with reference to the drawings, an information processing apparatus, a control program, and a control method according to an embodiment of the present invention will be described. Note that in the drawings, the same constituent elements are denoted by the same reference numerals, and redundant description thereof will be omitted. In addition, dimensional ratios in the drawings are exaggerated for convenience of description and may be different from actual ratios.

Figure 2:
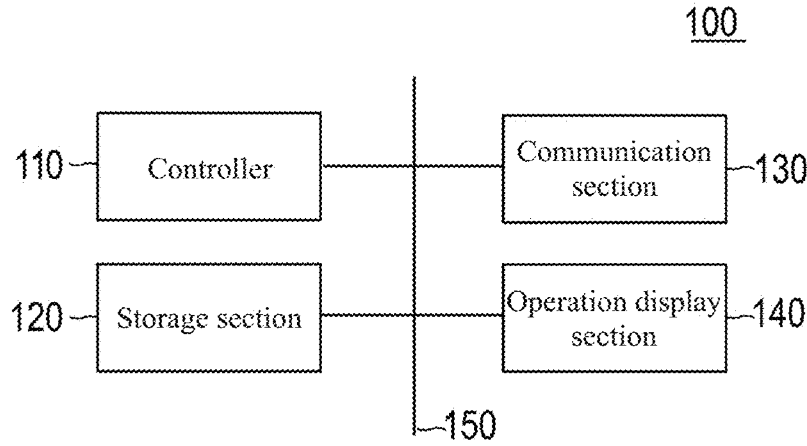
FIG. 2 is a block diagram of an inspection apparatus.

FIG. 1 is a diagram illustrating a configuration of an inspection system 10. FIG. 2 is a block diagram of an inspection apparatus 100 included in the inspection system 10. The inspection apparatus 100 may be configured by a plurality of apparatuses. The inspection apparatus 100 constitutes an information processing apparatus.

The inspection system 10 may include the inspection apparatus 100 and an imaging apparatus 200.

The imaging apparatus 200 captures an image 210 of a target 220 to be inspected (see FIG. 4) that is an object. Hereinafter, the image 210 of the target 220 to be inspected is also simply referred to as the "image 210". The image 210 may be an image of all or a part of the target 220. The image 210 may be an image including an object other than the target 220. The imaging apparatus 200 includes, for example, a camera. The target 220 is, for example, a product, and the product includes not only a finished product such as cloth or a semiconductor chip but also an unfinished product such as a semiconductor wafer upstream of a manufacturing process and a component such as a door of an automobile.

The image 210 may be, for example, a monochrome image or a color image, and may be a 128 pixel×128 pixel image. The imaging apparatus 200 transmits the image 210 to the inspection apparatus 100.

The inspection apparatus 100 detects (inspects) an abnormality of an analysis target based on the image 210. The abnormality includes, for example, a stain, discoloration, a flaw, a chip, a fold, a bend, and the like. As will be described later, the inspection apparatus 100 can detect the abnormality of the target 220 by outputting an abnormality degree indicating the degree of abnormality.

As illustrated in FIG. 2, the inspection apparatus 100 includes a controller 110, a storage section 120, a communication section 130, and an operation display section 140. These constituent elements are connected to each other via a bus 150. The inspection apparatus 100 is constituted of, for example, a computer terminal.

The controller 110 includes a central processing unit (CPU), and a memory such as a random access memory (RAM) and a read only memory (ROM).

The controller 110 performs control and arithmetic processing of the respective sections of the inspection apparatus 100 in accordance with a program. Details of functions of the controller 110 will be given later.

The storage section 120 includes a hard disc drive (HDD), a solid state drive (SSD), or the like, and stores various programs and various types of data.

The communication section 130 is an interface circuit (e.g., a local-area network (LAN) card) for communicating with an external apparatus through a network.

The operation display section 140 may be constituted of, for example, a touch panel. The operation display section 140 accepts various inputs from a user. The operation display section 140 displays various information including a result of detecting the abnormality of the target 220.

Functions of the controller 110 will be described.

Figure 3:
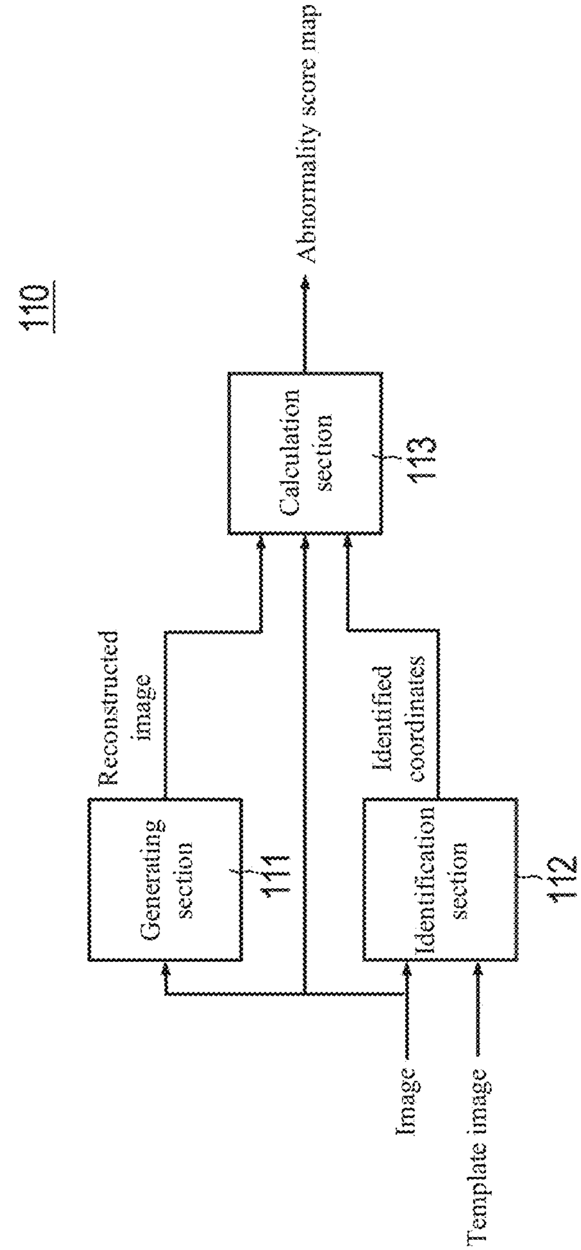
FIG. 3 is a functional block diagram of a controller.

FIG. 3 is a functional block diagram of the controller 110. The controller 110 functions as a generating section 111, an identification section 112, and a calculation section 113.

The generating section 111 acquires the image 210 and generates a reconstructed image 230 based on the image 210.

Figure 4:
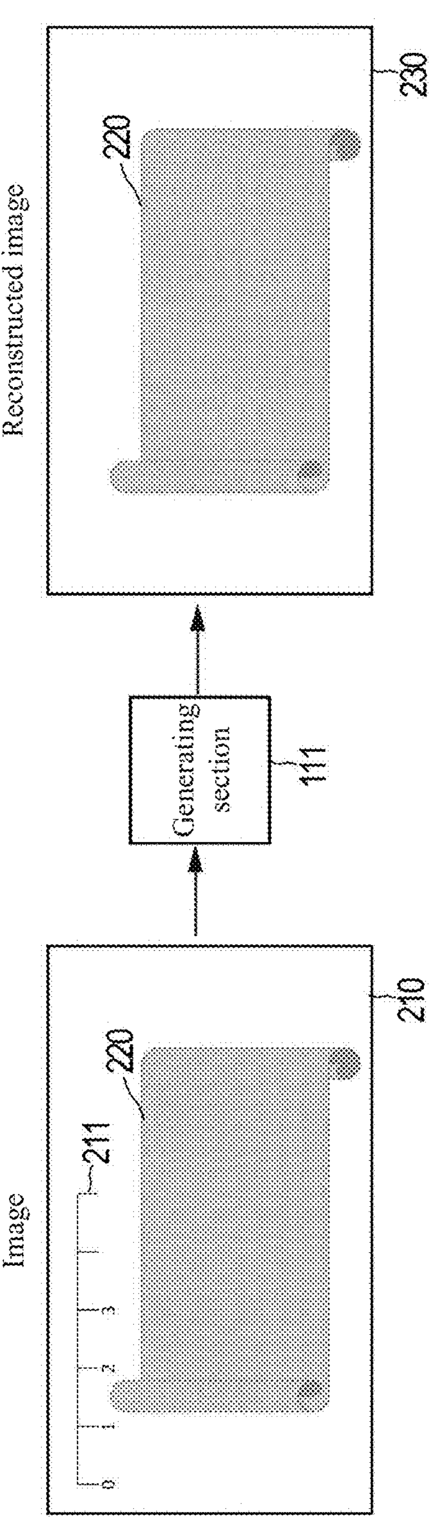
FIG. 4 is an explanatory diagram for describing generation of a reconstructed image.

FIG. 4 is an explanatory diagram for describing generation of a reconstructed image.

In an example illustrated in FIG. 4, the generating section 111 generates the reconstructed image 230 of cloth that is the target 220, based on the image 210 of the cloth that is the target 220. The generating section 111 generates the reconstructed image 230 in which a feature of a normal product is reproduced. The generating section 111 may be constituted of, for example, an autoencoder using a neural network. Hereinafter, for the sake of convenience in the description, the generating section 111 will be described as an autoencoder. The autoencoder constituting the generating section 111 is trained in advance using training data of a relatively large number of images 210 of normal products. Specifically, the image 210 of the normal product is input to the autoencoder. The autoencoder is trained in advance such that a difference (loss) between an output image (reconstructed image) output from the autoencoder by inputting the image 210 and the image 210 of the normal product is eliminated. The autoencoder is trained by back propagation. The autoencoder is trained using training data of only the image 210 of the normal product. Accordingly, the autoencoder is trained so as to reproduce the feature of the normal product in the output image. That is, irrespective of whether the image 210 is the image of the normal product or the image of the defective product, the autoencoder can generate, based on the input image 210, the reconstructed image 230 reproducing the feature of the normal product.

As illustrated in FIG. 4, in the image 210, a diagram 211 of a measure for dimension measurement which is drawn on a desk, both rounded ends of the cloth that is the target 220, and the like appear in some cases. The diagram 211 of the measure, the rounded ends of the cloth that is the target 220, and the like are objects other than the target 220. The diagram 211 of the measure, the rounded ends of the cloth that is the target 220, and the like appear in a non-inspection target region outside an inspection target region 212 (see FIG. 5) in which the visual inspection is required. In this case, there is a possibility that the objects that appear in the non-inspection target region of the image 210 are not reproduced or are incompletely reproduced in the reconstructed image 230. This is caused by an abnormal reaction in the generation of the reconstructed image 230 by the generating section 111. The example illustrated in FIG. 4 illustrates a case where the diagram 211 for dimension measurement in the non-inspection target region is not reproduced in the reconstructed image 230. It is considered that such a phenomenon occurs because of the following. For example, this is because the diagram 211 in the non-inspection target region is not included in the image 210 of the training data used for training of the autoencoder constituting the generating section 111. Alternatively, this is because a position of the diagram 211 on the image 210 varies. In addition, since the rounded ends of the cloth, which correspond to a part of the target 220, and the like in the non-inspection target region are not fixed in a rounded state, there is a possibility that the appearance of the rounded ends may vary. For this reason, there is a possibility that such a part of the target 220 is not reproduced or is incompletely reproduced in the reconstructed image 230 because of the abnormal reaction in the generation of the reconstructed image 230.

It is preferable that the generating section 111 generates the reconstructed image 230 having a region including the inspection target region 212 and wider than the inspection target region 212 from the image 210 having a region including the inspection target region 212 and wider than the inspection target region 212. This is because of the following reasons. In the reconstruction of the image 210 by the autoencoder or the like constituting the generating section 111, a convolution filter of a deep neural network does not often appropriately act at ends of the image 210. For this reason, there is a possibility that reconstruction accuracy at the ends of the image 210 decreases. Therefore, when the inspection target region 212 is extracted from the image 210 and the reconstructed image 230 is generated based on an image of only the inspection target region 212, there is a possibility that the reconstruction accuracy decreases in a part (ends) of the inspection target region 212. Therefore, the reconstructed image 230 having the region including the inspection target region 212 and wider than the inspection target region 212 is generated from the image 210 having the region including the inspection target region 212 and wider than the inspection target region 212. Thus, it is possible to prevent the reconstruction accuracy from decreasing in a part of the inspection target region 212.

The identification section 112 identifies the inspection target region 212 in the image 210 based on the image 210. The inspection target region 212 is, for example, a region within a rectangle in the image 210, and the identification section 112 can identify the inspection target region 212 by, for example, coordinates of opposite corners of the rectangle. Hereinafter, for the sake of convenience in the description, the inspection target region 212 will be described as having a rectangular shape. The coordinates of the opposite corners of the rectangle identified as the inspection target region 212 by the identification section 112 are also referred to as "identified coordinates 213" (see FIG. 5).

Figure 5:
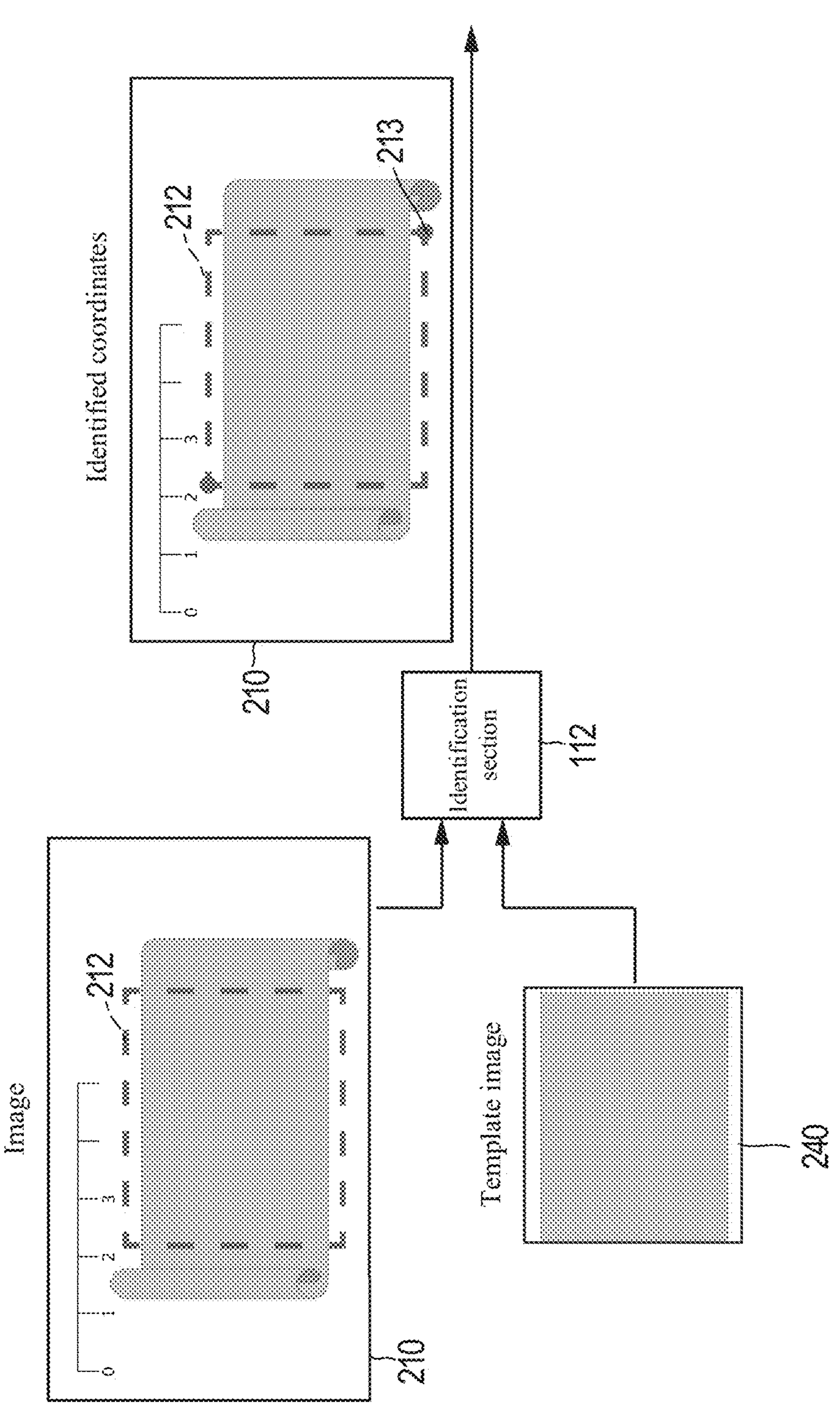
FIG. 5 is an explanatory diagram for describing identification of an inspection target region based on an image.

FIG. 5 is an explanatory diagram for describing identification of the inspection target region 212 based on the image 210. Note that in FIG. 5, for the sake of convenience in the description, the inspection target region 212 is also indicated by a broken line in the image 210.

The identification section 112 can identify the inspection target region 212 in the image 210 as follows. The identification section 112 uses a template image 240 of the inspection target region 212 of the input normal product. Then, the identification section 112 can identify the inspection target region 212 by template matching between the template image 240 and the image 210. The template image 240 constitutes a predetermined reference image. The template matching is the following method. The template image 240 is shifted on the image 210 in units of pixels, and the similarity is calculated. Thus, a portion on the image 210 which is most similar to the template image 240 is detected. Although omitted in FIG. 5 and the like, the target 220 may have a feature such as a pattern in addition to the feature of the shape.

For each input image 210, the identification section 112 can identify the inspection target region 212 in the image 210 using the template image 240. Note that the identification section 112 may identify the inspection target region 212 as follows. The coordinates of the inspection target region 212 identified based on one image 210 are used in common for the plurality of images 210. Then, the inspection target region 212 is identified in each of the plurality of images 210.

As described above, the inspection target region 212 is identified by the template image 240. Accordingly, designation of the template image 240 corresponds to designation of the inspection target region 212. The template image 240 can be designated, for example, as follows. The controller 110 constitutes a reception section and displays the image 210 of the normal product on the operation display section 140. The controller 110 displays the image 210 of the normal product and also receives the designation of the inspection target region 212 by the user. The controller 110 receives the designation of the inspection target region 212 by the user as the designation of the template image 240. The template image 240 may be designated for each product. The template image 240 can be stored in the storage section 120 in association with a product (e.g., identification data for identifying a product). When the image 210 is input (acquired), the identification section 112 acquires the template image 240 associated with the product to which the target 220 in the image 210 belongs. The identification section 112 acquires the template image 240 from the storage section 120.

Figure 6:
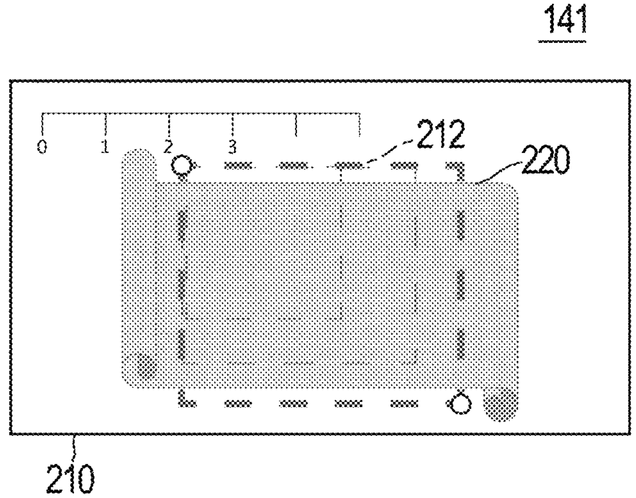
FIG. 6 is a diagram illustrating a user interface screen for designating an inspection target region in an image of a normal product.

FIG. 6 is a diagram illustrating a user interface screen 141 for designating the inspection target region 212 in the image 210 of the normal product. The user interface screen 141 can be displayed on the operation display section 140.

In an example of FIG. 6, the image 210 of the normal product is displayed on the user interface screen 141. The user inputs the inspection target region 212 by, for example, clicking positions of a pair of opposite corners (positions indicated by white circles in FIG. 6) of a rectangle on the displayed image 210. Thus, the user can designate the rectangle as the inspection target region 212.

The designation of the template image 240 described above (that is, the designation of the inspection target region 212) is preferably performed at the time of training of the generating section 111. The image 210 used as training data at the time of the training of the generating section 111 is the image 210 of the normal product. Therefore, by performing the designation of the inspection target region 212 at the time of the training of the generating section 111, the designation of the inspection target region 212 can be performed in a short time and efficiently.

When a relatively large number of images 210 of normal products can be prepared, the identification section 112 may identify the inspection target region 212 in the image 210 by machine learning. Specifically, the inspection target region 212 on the image 210 of the normal product is set as a positive example, and a region not including the inspection target region 212 is set as a negative example. Then, a neural network model trained by these pieces of training data is used. Then, the inspection target region 212 on the image 210 is classified from the image 210 by the neural network model. Accordingly, the inspection target region 212 may be identified. For the detection of the inspection target region 212 using the neural network, known methods such as VGG, EfficientNet, and Vision Transformer can be used. Further, the image 210 of the normal product is set as input data, and the inspection target region 212 on the image 210 is set as a ground truth label. Then, a neural network model trained by these pieces of training data is used. The inspection target region 212 on the image 210 is specifically a range of the inspection target region 212 on the image 210. The inspection target region 212 on the image 210 is, for example, coordinates of the pair of opposite corners of the rectangle that is the inspection target region 212 on the image 210. Then, the inspection target region 212 on the image 210 is detected from the image 210 by the neural network model. Accordingly, the inspection target region 212 may be identified. For the detection of the inspection target region 212 using the neural network, known methods such as YOLO, EfficientDet, and Detection Transformer can be used.

The inspection target region 212 used as the ground truth label in the training of the neural network model can be designated as follows. The controller 110 displays the image 210 of the normal product on the operation display section 140 and receives the designation of the inspection target region 212 by the user. Specifically, the controller 110 receives two positions input by the user by clicking or the like on the image 210 of the normal product displayed on the operation display section 140. The controller 110 receives the two positions input by clicking or the like by the user as the coordinates of the pair of opposite corners of the rectangle that is the inspection target region 212 on the image 210. As a result, the inside of the rectangle in the image 210, which has the received two positions as the opposite corners, is designated as the inspection target region 212. The user can designate, using a user interface screen, the inspection target region 212 to be used as the ground truth label in the training of the neural network model. The user interface screen is a user interface screen similar to the user interface screen 141 (see FIG. 6) described above. The user interface screen 141 is used for designating the inspection target region 212 in the image 210 of the normal product.

It is preferable that the training of the identification section 112 (the training of the neural network model) is performed at the time of the training of the generating section 111. The image 210 used as training data at the time of the training of the generating section 111 is the image 210 of the normal product. Therefore, the designation of the inspection target region 212 to be used as the ground truth label for the training of the identification section 112 is performed at the time of the training of the generating section 111. Thus, it is possible to efficiently acquire the training data used for the training of the identification section 112.

The identification section 112 can identify the inspection target region 212 in the image 210 as the identified coordinates 213 described above.

The calculation section 113 calculates a difference in the inspection target region 212 between the image 210 and the reconstructed image 230. Specifically, the calculation section 113 compares a portion of the inspection target region 212 extracted from the image 210 with a portion corresponding to the inspection target region 212 extracted from the reconstructed image 230. The portion corresponding to the inspection target region 212 extracted from the reconstructed image 230 is hereinafter also referred to as a "corresponding region 231" (see FIG. 7). Accordingly, the calculation section 113 can calculate the difference in the inspection target region 212 between the image 210 and the reconstructed image 230.

Figure 7:
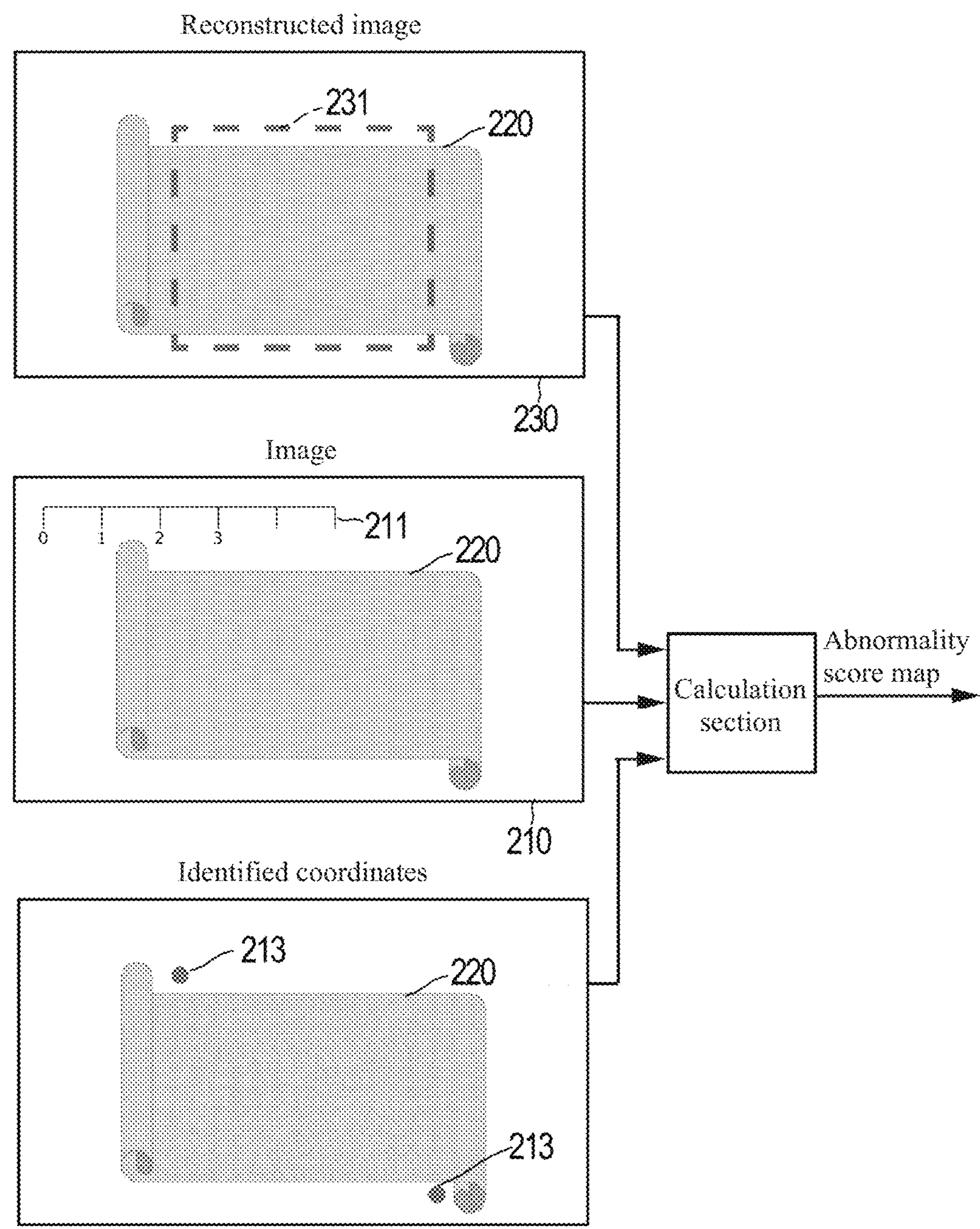
FIG. 7 is an explanatory diagram for describing calculation of a difference in the inspection target region between the image and the reconstructed image.

FIG. 7 is an explanatory diagram for describing calculation of the difference in the inspection target region 212 between the image 210 and the reconstructed image 230. For the sake of convenience in the description, the corresponding region 231 is also illustrated in the reconstructed image 230. In addition, the target 220 is also illustrated in the diagram illustrating the identified coordinates 213.

The calculation section 113 can use the identified coordinates 213 identified by the identification section 112 for extraction of the corresponding region 231 in the reconstructed image 230. That is, the calculation section 113 extracts, as the corresponding region 231, the rectangle having the identified coordinates 213 as the pair of opposite corners in the reconstructed image 230.

The calculation section 113 compares the entirety of the image 210 with the entirety of the reconstructed image 230. Thus, the calculation section 113 extracts the difference corresponding to the inspection target region 212 from the calculated differences. Accordingly, the calculation section 113 may calculate the difference in the inspection target region 212 between the image 210 and the reconstructed image 230.

The difference in the inspection target region 212 between the image 210 and the reconstructed image 230 may be a pixel-based difference. The calculation section 113 may calculate, as an abnormality score map indicating the abnormality degree, the difference in the inspection target region 212 between the image 210 and the reconstructed image 230. The abnormality score map is a diagram in which the score of the abnormality degree corresponding to the magnitude of the difference between the image 210 and the reconstructed image 230 is indicated by, for example, color, brightness, density, or the like in units of pixels. In the abnormality score map, a portion where the abnormality degree of the target 220 is high can be emphasized. The score of the abnormality degree may be the magnitude itself of the difference between the image 210 and the reconstructed image 230 (e.g., an absolute value difference between pixel values). The score of the abnormality degree may be a proportion (e.g., 0.3 or the like) of the difference for each pixel when the maximum value of the difference is set to 1.

The calculation section 113 outputs the calculated abnormality score map. The calculation section 113 can output the abnormality score map by displaying the abnormality score map on the operation display section 140. The calculation section 113 may output the abnormality score map by transmitting the abnormality score map to an external apparatus or the like via the communication section 130.

Figure 8A:
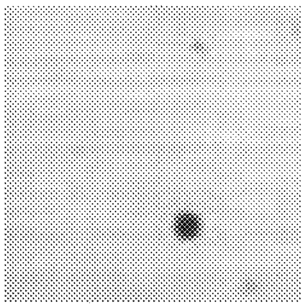
FIG. 8A is a diagram illustrating an example of an inspection target region extracted from an image of a defective product.
Figure 8B:
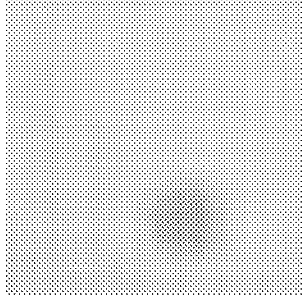
FIG. 8B is a diagram illustrating an example of a corresponding region extracted from a reconstructed image.
Figure 8C:
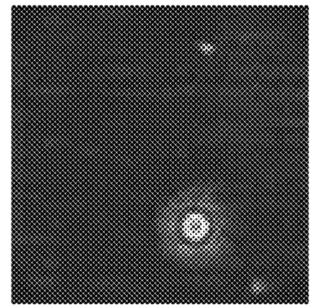
FIG. 8C is a diagram illustrating an example of an abnormality score map.

FIG. 8A is a diagram illustrating an example of the inspection target region 212 extracted from the image 210 of the defective product. FIG. 8B is a diagram illustrating an example of the corresponding region 231 extracted from the reconstructed image 230. FIG. 8C is a diagram illustrating an example of the abnormality score map.

The example of FIG. 8A illustrates the inspection target region 212 of the image 210 of the defective product including a defect of a round stain. The example of FIG. 8B illustrates the corresponding region 231 of the reconstructed image 230 reconstructed from the image 210 of the defective product. Since the feature of the non-defective product is extracted from the image 210 of the defective product and is reconstructed, the reconstructed image 230 is an image without (with disappearance of) the round stain that is the defect. The example of FIG. 8C illustrates the abnormality score map generated based on comparison between the inspection target region 212 in FIG. 8A and the corresponding region 231 in FIG. 8B. As illustrated in FIG. 8C, in the abnormality score map, the abnormality score for each pixel can be indicated by a color or the like corresponding to the magnitude of the abnormality score.

Figure 9:
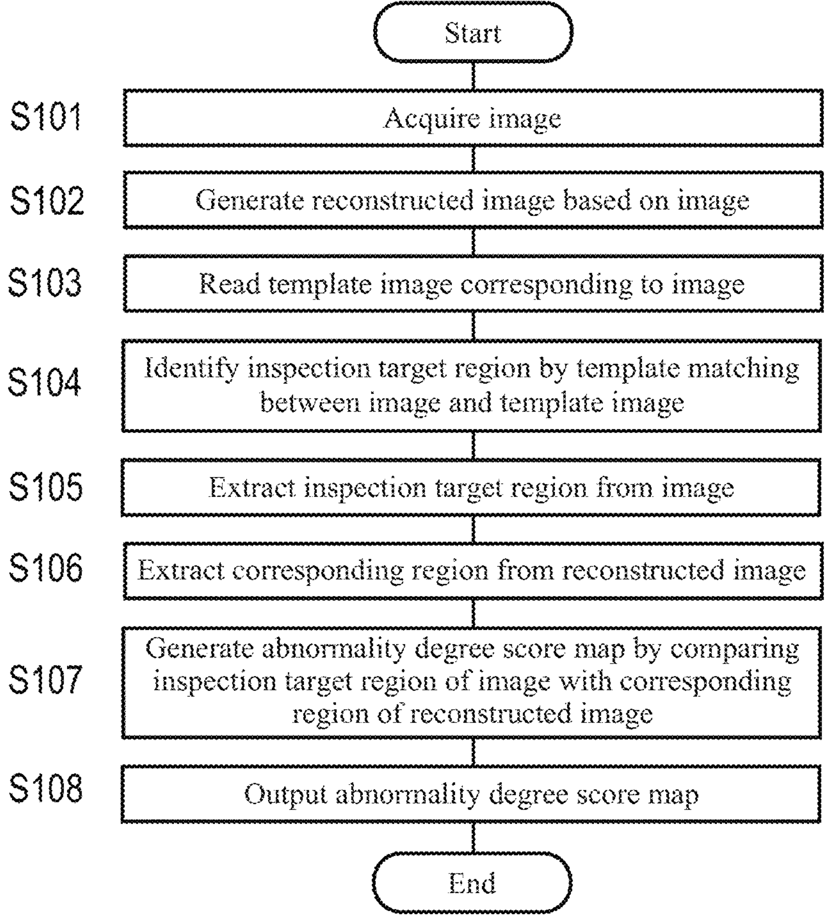
FIG. 9 is a flowchart illustrating an operation of the inspection system.

FIG. 9 is a flowchart illustrating an operation of the inspection system 10. The flowchart can be executed by the controller 110 of the inspection apparatus 100 in accordance with a program.

The controller 110 acquires the image 210 by receiving it from the imaging apparatus 200 (S101). The controller 110 may acquire the image 210, which is stored in the storage section 120, by reading it from the storage section 120.

The controller 110 generates the reconstructed image 230 by reconstructing the image 210 using an autoencoder or the like based on the image 210 (S102).

The controller 110 reads the template image 240 corresponding to the image 210 from the storage section 120 (S103).

The controller 110 identifies the inspection target region 212 by template matching or the like between the image 210 and the template image 240 (S104).

The controller 110 extracts the inspection target region 212 from the image 210 (S105).

The controller 110 extracts the corresponding region 231 from the reconstructed image 230 (S106).

The controller 110 generates the abnormality score map by comparing the extracted inspection target region 212 of the image 210 with the extracted corresponding region 231 of the reconstructed image 230 (S107).

The controller 110 outputs the abnormality score map (S108).

The embodiment has the following effects.

The inspection target region in the image is identified based on the image, and the difference in the inspection target region between the reconstructed image generated based on the image and the image is calculated. Thus, even in the case where the region other than the inspection target region appears in the image of the object or even in the case where the appearance of the object partially varies because of the nature of the object, it is possible to prevent the erroneous detection of the abnormality.

Further, the inspection target region is identified for each image based on the image. Thus, accuracy in detection of the abnormality can be improved.

Further, the difference in the inspection target region is calculated by comparing the portion of the inspection target region extracted from the image with the portion corresponding to the inspection target region extracted from the reconstructed image. Thus, the amount of calculation for abnormality detection can be reduced.

Further, the difference in the inspection target region is calculated by extracting the difference corresponding to the inspection target region from the differences calculated by comparing the entirety of the image with the entirety of the reconstructed image. Thus, erroneous detection of the abnormality can be prevented more easily.

Further, the inspection target region in the image is identified by pattern matching between the predetermined reference image and the image. Thus, the inspection target region can be identified simply and highly accurately.

The inspection target region is identified by estimating the inspection target region from the image using the learned model trained through machine learning so as to estimate the inspection target region from the image. Thus, the inspection target region can be identified with high accuracy.

Further, designation of the inspection target region in the image of the non-defective product is received. Next, the learned model is set as a learned model trained through machine learning so as to estimate an inspection target region from an image using the designated inspection target region as training data. Thus, the inspection target region can be identified with high accuracy.

Further, the designation of the inspection target region in the image of the non-defective product is received, and the inspection target region in the image is identified based on the designated inspection target region. Thus, the inspection target region can be designated more easily.

Further, the abnormality degree of the image is calculated based on the difference in the inspection target region between the reconstructed image and the image. Thus, the abnormality of the product can be directly grasped.

The description given above on the information processing apparatus, the control program, and the control method is about main components for describing the features of the above-described embodiment. Therefore, the information processing apparatus, the control program, and the control method are not limited to the above-described configurations, and can be variously modified within the scope of the claims. Furthermore, the descriptions above are not intended to exclude any configuration included in a general information processing apparatus or the like.

For example, some of the steps in the flowchart described above may be omitted, and other steps may be added. Furthermore, some of the steps may be executed at the same time, and one step may be divided into a plurality of steps and executed.

Furthermore, the means and method for performing various kinds of processing in the system described above can be implemented by either a dedicated hardware circuit or a programmed computer. For example, the programs may be provided by a computer-readable recording medium such as a universal serial bus (USB) memory or a digital versatile disc (DVD)-ROM or may be provided online via a network such as the Internet. In this case, the program recorded on the computer-readable recording medium is generally transferred to and stored in a storage section such as a hard disk. Furthermore, the program may be provided as a single piece of application software, or may be incorporated, as a function, into software of an apparatus such as an abnormality detection apparatus.

This application is based on Japanese Patent Application (Japanese Patent Application No. 2021-052771) filed on Mar. 26, 2021, the disclosure of which is incorporated herein by reference in its entirety.

REFERENCE SIGNS LIST

10 inspection system
100 inspection apparatus
110 controller
111 generating section
112 identification section
113 calculation section
120 storage section
130 communication section
140 operation display section
200 imaging apparatus
210 image
212 inspection target region
213 identified coordinates
220 target
230 reconstructed image
231 corresponding region
240 template image

The invention claimed is:

1. An information processing apparatus comprising:
a hardware processor that:
acquires an image and generates a reconstructed image with reproduced features of a normal product based on the image;
identifies an inspection target region for detecting abnormalities in the image based on a region of a part of the image; and
calculates a difference in the inspection target region between the image and the reconstructed image,
wherein the hardware processor generates the reconstructed image based on an image of a region that includes the inspection target region, the region being larger than the inspection target region and smaller than an entire region of the image.

2. The information processing apparatus according to claim 1, wherein the hardware processor identifies, for each image, the inspection target region based on the image.

3. The information processing apparatus according to claim 1, wherein the hardware processor calculates the difference in the inspection target region by comparing a portion of the inspection target region extracted from the image with a portion corresponding to the inspection target region extracted from the reconstructed image.

4. The information processing apparatus according to claim 1, wherein the hardware processor calculates the difference in the inspection target region by extracting the difference corresponding to the inspection target region from the differences calculated by comparing entirety of the image with entirety of the reconstructed image.

5. The information processing apparatus according to claim 1, wherein the hardware processor identifies the inspection target region in the image by pattern matching between a predetermined reference image and the image.

6. The information processing apparatus according to claim 1, wherein the hardware processor identifies the inspection target region by estimating the inspection target region from the image using a learned model trained through machine learning so as to estimate the inspection target region from the image.

7. The information processing apparatus according to claim 6, wherein
the hardware processor receives designation of the inspection target region in a non-defective product image that is the image of a non-defective product, and
the learned model is trained through machine learning so as to estimate the inspection target region from the image using as training data the inspection target region designated.

8. The information processing apparatus according to claim 1, wherein
the hardware processor
receives designation of the inspection target region in a non-defective product image that is the image of a non-defective product, and
identifies the inspection target region in the image based on the inspection target region designated.

9. The information processing apparatus according to claim 1, wherein the hardware processor calculates an abnormality degree of the image based on the difference.

10. A non-transitory recording medium storing a computer readable program for causing a computer to execute:
(a) acquiring an image and generating a reconstructed image with reproduced features of a normal product based on the image;
(b) identifying an inspection target region for detecting abnormalities in the image based on a region of a part of the image; and
(c) calculating a difference in the inspection target region between the image and the reconstructed image,
wherein the reconstructed image is generated based on an image of a region that includes the interception target region, the region being larger than the inspection target region and smaller than an entire region of the image.

11. A control method comprising:
(a) acquiring an image and generating a reconstructed image with reproduced features of a normal product based on the image;
(b) identifying an inspection target region for detecting abnormalities in the image based on the image; and
(c) calculating a difference in the inspection target region between the image and the reconstructed image,
wherein the reconstructed image is generated based on an image of a region that includes the interception target region, the region being larger than the inspection target region and smaller than an entire region of the image.

* * * * *